(12) United States Patent
Katano

(10) Patent No.: US 8,706,997 B2
(45) Date of Patent: Apr. 22, 2014

(54) STORAGE DEVICE, ACCESS CONTROL PROGRAM RECORDING MEDIUM, AND CONTROL METHOD OF STORAGE DEVICE

(75) Inventor: Atsushi Katano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 13/167,353

(22) Filed: Jun. 23, 2011

(65) Prior Publication Data

US 2012/0005442 A1    Jan. 5, 2012

(30) Foreign Application Priority Data

Jul. 2, 2010   (JP) .................................. 2010-152428

(51) Int. Cl.
*G06F 12/00* (2006.01)

(52) U.S. Cl.
USPC .................................. 711/163; 711/E12.096

(58) Field of Classification Search
None
See application file for complete search history.

(56) References Cited

U.S. PATENT DOCUMENTS

| | | | | |
|---|---|---|---|---|
| 5,136,692 | A * | 8/1992 | Barrett et al. ...................... | 710/5 |
| 5,878,415 | A * | 3/1999 | Olds ..................................... | 1/1 |
| 6,467,032 | B1 * | 10/2002 | Lippert ........................ | 711/150 |
| 6,704,672 | B2 * | 3/2004 | Weickert et al. ................ | 702/79 |
| 6,883,066 | B2 * | 4/2005 | Herbst et al. ................... | 711/118 |
| 7,047,322 | B1 * | 5/2006 | Bauman et al. .................... | 710/6 |
| 7,185,146 | B2 * | 2/2007 | Masuyama et al. ........... | 711/115 |
| 7,200,593 | B2 * | 4/2007 | Shimomura et al. .................. | 1/1 |
| 7,421,541 | B2 * | 9/2008 | Long et al. .................... | 711/141 |
| 2003/0061444 | A1 * | 3/2003 | Herbst et al. .................. | 711/118 |
| 2005/0055572 | A1 | 3/2005 | Warwick et al. | |
| 2005/0091504 | A1 | 4/2005 | Shirogane | |
| 2005/0204092 | A1 * | 9/2005 | Masuyama et al. ........... | 711/103 |
| 2005/0216794 | A1 * | 9/2005 | Yagawa .......................... | 714/42 |
| 2008/0114957 | A1 * | 5/2008 | Safa ................................ | 711/163 |
| 2009/0222614 | A1 * | 9/2009 | Kurashige ..................... | 711/103 |

FOREIGN PATENT DOCUMENTS

| | | |
|---|---|---|
| JP | 2005-85279 | 3/2005 |
| JP | 2005-134961 | 5/2005 |
| JP | 2005-266952 | 9/2005 |
| JP | 2008-97210 | 4/2008 |

OTHER PUBLICATIONS

Margaret Rouse, "Access Control List (ACL)", Jan. 2006, pp. 1-2, http://searchsoftwarequality.techtarget.com/definition/access-control-list.*
Webopedia, "ACL", Oct. 22, 2002, pp. 1, http://web.archive.org/web/20021022085656/http://www.webopedia.com/TERM/A/ACL.html.*
Cisco, "Access Control Lists: Overview and Guidelines", Jul. 14, 2007, pp. 1-6, http://web.archive.org/web/20070714010115/http://www.cisco.com/en/US/docs/ios/11_3/security/configuration/guide/scacls.html.*
Office Action issued by the Japanese Patent Office on Feb. 4, 2014 in the corresponding Japanese patent application No. 2010-152428.

* cited by examiner

*Primary Examiner* — Edward Dudek, Jr.
*Assistant Examiner* — Christopher Birkhimer
(74) *Attorney, Agent, or Firm* — Staas & Halsey LLP

(57) ABSTRACT

A storage device for storing data includes a device configured to store data read or written by a host, a command storage unit configured to store commands transmitted by the host to acquire information relating to the device, a command acquisition unit configured to acquire commands issued to the device when the host requests access to the data stored in the device, and an access determination unit configured to permit the access, if the commands acquired by the command acquisition unit have been stored in the command storage unit.

7 Claims, 13 Drawing Sheets

FIG. 3

| HOST ID | HOST NAME |
|---------|-----------|
| 1 | xxx1 |
| 1 | xxx2 |
| ⋮ | ⋮ |

FIG. 4

| COMMAND STORAGE TABLE ID | HOST ID | ISSUANCE VOLUME | SCSI COMMAND | NUMBER OF ISSUANCES |
|---|---|---|---|---|
| 1 | 1 | 0 | INQUIRY STANDARD | 3 |
| 1 | 1 | 0 | INQUIRY PAGE | 3 |
| 1 | 1 | 0 | REPORT LUNS | 0 |
| 1 | 1 | 0 | TEST UNIT READY | 1 |
| 1 | 1 | 0 | START STOP UNIT | 1 |
| 1 | 1 | 0 | READY CAPACITY (10) | 1 |
| 1 | 1 | 0 | READY CAPACITY (16) | 0 |
| 1 | 1 | 0 | LOG SENSE | 1 |
| 1 | 1 | 0 | MODE SENSE (6) PAGE | 2 |
| 1 | 1 | 0 | MODE SENSE (10) PAGE | 0 |
| 1 | 1 | 0 | OTHER COMMAND | 1 |
| 1 | 1 | 0 | INQUIRY STANDARD | 3 |
| 1 | 1 | 0 | INQUIRY PAGE | 0 |

FIG. 5

| COMMAND STORAGE TABLE ID | HOST ID | ISSUANCE VOLUME | SCSI COMMAND | NUMBER OF ISSUANCES |
|---|---|---|---|---|
| 2 | 2 | 1 | INQUIRY STANDARD | 3 |
| 2 | 2 | 1 | INQUIRY PAGE | 3 |
| 2 | 2 | 1 | REPORT LUNS | 0 |
| 2 | 2 | 1 | TEST UNIT READY | 1 |
| 2 | 2 | 1 | START STOP UNIT | 1 |
| 2 | 2 | 1 | READY CAPACITY (10) | 1 |
| 2 | 2 | 1 | READY CAPACITY (16) | 0 |
| 2 | 2 | 1 | LOG SENSE | 1 |
| 2 | 2 | 1 | MODE SENSE (6) PAGE | 2 |
| 2 | 2 | 1 | MODE SENSE (10) PAGE | 0 |
| 2 | 2 | 1 | OTHER COMMAND | 1 |

FIG. 6

| BYTE \ BIT | 7 | 6 | 5 | 4 | 3 | 2 | 1 | 0 |
|---|---|---|---|---|---|---|---|---|
| 0 | \multicolumn{8}{c}{OPERATION·CORD} |
| 1 | | | | | | | | |
| ... | | | | | | | | |
| N | | | | | | | | |

PARAMETER (bytes 1…N)

FIG. 7

| HOST ID | NO | SCSI COMMAND | ISSUANCE VOLUME |
|---|---|---|---|
| 1 | 1 | INQUIRY STANDARD | 0 |
| 1 | 2 | INQUIRY STANDARD | 0 |
| 1 | 3 | TEST UNIT READY | 0 |
| 1 | 4 | START STOP UNIT | 0 |
| 1 | 5 | INQUIRY STANDARD | 0 |
| 1 | 6 | READY CAPACITY (10) | 0 |
| 1 | 7 | LOG SENSE | 0 |
| 1 | 8 | MODE SENSE (6) PAGE 03 | 0 |
| 1 | 9 | MODE SENSE (10) PAGE 04 | 0 |
| 1 | 10 | INQUIRY PAGE 00 | 0 |
| 1 | 11 | INQUIRY PAGE 80 | 0 |
| 1 | 12 | INQUIRY PA83 00 | 0 |
| 1 | 13 | PERSISTENT RESERVE IN | 0 |

FIG. 8

| HOST ID | ISSUANCE VOLUME | SCSI COMMAND | NUMBER OF ISSUANCES |
|---|---|---|---|
| 1 | 0 | INQUIRY STANDARD | 3 |
| 1 | 0 | INQUIRY PAGE | 3 |
| 1 | 0 | REPORT LUNS | 0 |
| 1 | 0 | TEST UNIT READY | 1 |
| 1 | 0 | START STOP UNIT | 1 |
| 1 | 0 | READY CAPACITY (10) | 1 |
| 1 | 0 | READY CAPACITY (16) | 0 |
| 1 | 0 | LOG SENSE | 1 |
| 1 | 0 | MODE SENSE (6) PAGE | 2 |
| 1 | 0 | MODE SENSE (10) PAGE | 0 |
| 1 | 0 | OTHER COMMAND | 1 |

FIG. 9

| HOST ID | ISSUANCE VOLUME | SCSI COMMAND | NUMBER OF ISSUANCES |
|---|---|---|---|
| 2 | 1 | INQUIRY STANDARD | 2 |
| 2 | 1 | INQUIRY PAGE | 0 |
| 2 | 1 | REPORT LUNS | 1 |
| 2 | 1 | TEST UNIT READY | 1 |
| 2 | 1 | START STOP UNIT | 0 |
| 2 | 1 | READY CAPACITY (10) | 1 |
| 2 | 1 | READY CAPACITY (16) | 0 |
| 2 | 1 | LOG SENSE | 0 |
| 2 | 1 | MODE SENSE (6) PAGE | 2 |
| 2 | 1 | MODE SENSE (10) PAGE | 0 |
| 2 | 1 | OTHER COMMAND | 0 |

STORAGE DEVICE, ACCESS CONTROL PROGRAM RECORDING MEDIUM, AND CONTROL METHOD OF STORAGE DEVICE

CROSS-REFERENCE TO RELATED APPLICATIONS

This application is based upon and claims the benefit of priority of the prior Japanese Patent Application No. 2010-152428, filed on Jul. 2, 2010, the entire contents of which are incorporated herein by reference.

FIELD

Embodiments discussed herein relate to a storage device, an access control program recording medium, and a control method of a storage device.

BACKGROUND

A storage device shared by a plurality of host servers stores data by allocating a specific region for each of the host servers. That is, the storage device stores data read or written by a host server and data received from another host server. In such a circumstance, to prevent the data from being destroyed or leaked by a malicious user, the storage device performs access restriction by granting access authority only to a specified user and restricting access from an unspecified user.

For example, with the use of iSCSI (Internet Small Computer System Interface) Name or World Wide Name uniquely determined for each host server (hereinafter referred to as the "host name"), the storage device identifies the host server which has accessed the storage device. Further, the storage device only accepts access from a host server, the host name of which has been registered, and rejects access from a host server, the host name of which has not been registered. Thereby, the storage device restricts access from an unspecified host server.

The identification of a host server by a storage device will be described with reference to a specific example. FIG. 13 is a diagram for explaining host identification by a storage device. The storage device illustrated in FIG. 13 has registered a host name "xxx1" of a host A as an access-permitted host. Further, the storage device is connected to the host A and a host B via a network, such as an IP (Internet Protocol) network or a SAN (Storage Area Network).

Further, if an access request is received from the host A, the storage device acquires the host name "xxx1" of the host A. The storage device determines that the acquired host name "xxx1" has been registered, and permits access from the host A.

Meanwhile, if an access request is received from the host B, the storage device acquires a host name "xxx2" of the host B. The storage device determines that the acquired host name "xxx2" has not been registered, and rejects access from the host B. As well as the method using the host name, a method of identifying a host server by using the MAC (Media Access Control) address or the IP address has also been used.

The above-described related art, however, has an issue of difficulty in preventing spoofing by a third party. Specifically, if the storage device is accessed by a third party having acquired a valid host name in some way, the storage device is incapable of distinguishing the third party from a valid host server.

In the example illustrated in FIG. 13, if an access request is received from the unregistered host B, the storage device rejects access on the ground that the host name "xxx2" for identifying the host B has not been registered. If the host B has acquired the host name of the host A in some way, however, the storage device determines the host B as the registered host A. Thus, the storage device permits access from the unauthorized host B. That is, if the storage device identifies a host on the basis of the host name, the storage device is incapable of preventing spoofing by a third party having acquired a registered host name in some way.

SUMMARY

According to an aspect of the embodiment, a storage device for storing data includes, a device configured to store data read or written by a host, a command storage unit configured to store commands transmitted by the host to acquire information relating to the device, a command acquisition unit configured to acquire commands issued to the device when the host requests access to the data stored in the device, and an access determination unit configured to permit the access, if the commands acquired by the command acquisition unit have been stored in the command storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating an example of information stored as a host name storage table;

FIG. 4 is a diagram illustrating an example of information stored as a command storage table;

FIG. 5 is a diagram illustrating another example of information stored as a command storage table;

FIG. 6 is a diagram illustrating an example of a CDB format storing commands acquired by a command acquisition unit;

FIG. 7 is a diagram illustrating an example of commands issued by a host;

FIG. 8 is a diagram illustrating an example of host-issued commands counted by the command acquisition unit;

FIG. 9 is a diagram illustrating another example of host-issued commands counted by the command acquisition unit;

DESCRIPTION OF THE EMBODIMENT(S)

Embodiments of a storage device and an access control program disclosed in the present application will be described in detail below on the basis of the drawings. The present invention is not limited by the embodiments.

Figure 1:
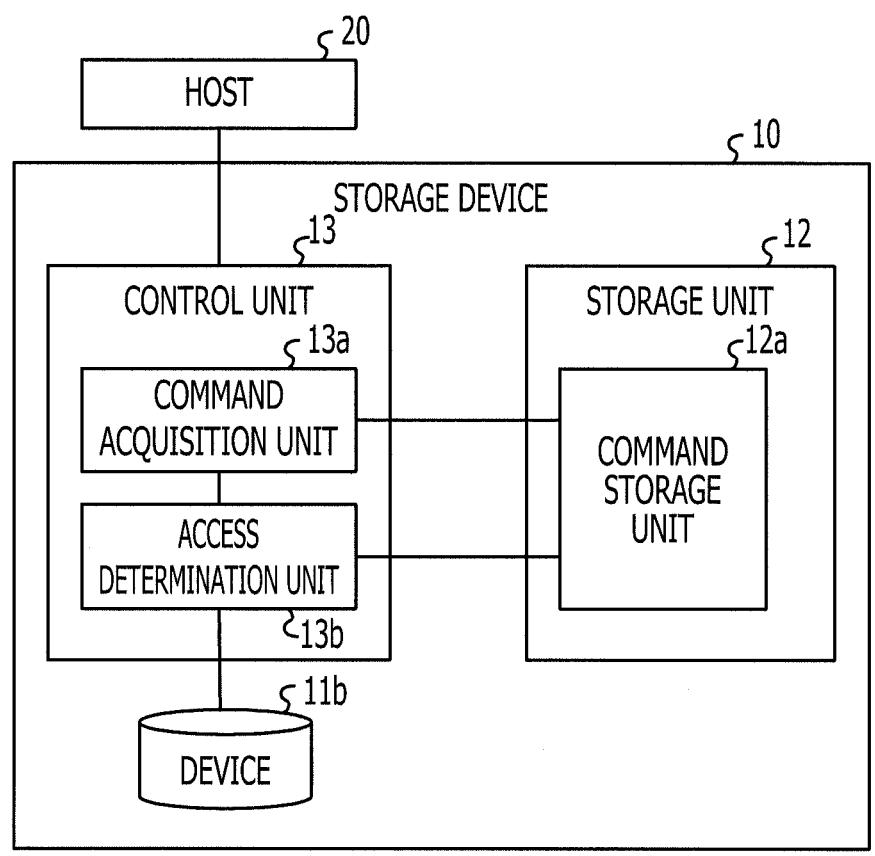
FIG. 1 is a block diagram illustrating a configuration of a storage device according to a first embodiment.

FIG. 1 is a block diagram illustrating a configuration of a storage device 10 according to a first embodiment. As illustrated in FIG. 1, the storage device 10 includes a device 11b, a storage unit 12, and a control unit 13. Further, the storage device 10 is connected to a host 20.

The device 11b stores data read or written by the host 20. The storage unit 12 includes a command storage unit 12a. The command storage unit 12a stores commands for acquiring information relating to the device 11b. The control unit 13 includes a command acquisition unit 13a and an access determination unit 13b. The command acquisition unit 13a acquires commands issued to the device 11b when the host 20 requests access to data stored in the device 11b. The access determination unit 13b permits the access, if the commands acquired by the command accusation unit 13a have been stored in the command storage unit 12a.

As described above, in the present first embodiment, the access determination unit 13b permits the access, if the commands issued by the host 20 match the commands stored in the command storage unit 12a. Therefore, the storage device 10 is capable of preventing spoofing by a host.

Figure 2:
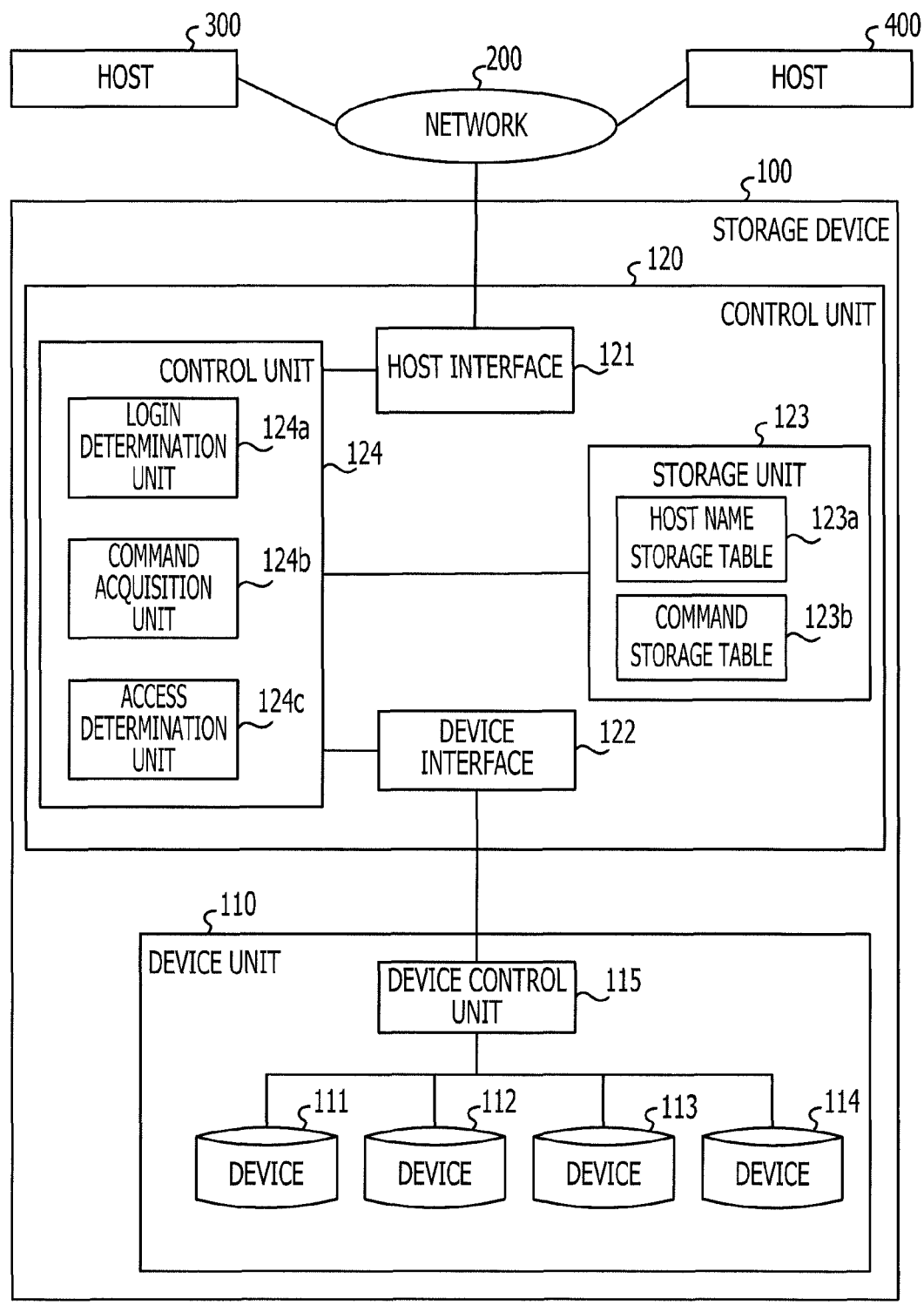
FIG. 2 is a block diagram illustrating a configuration of a storage device according to a second embodiment.

Configuration of Storage Device According to Second Embodiment: Subsequently, a configuration of a storage device 100 according to a second embodiment will be described with reference to FIG. 2. FIG. 2 is a block diagram illustrating a configuration of the storage device 100 according to the second embodiment. The storage device 100 according to the second embodiment includes a device unit 110 and a control unit 120. Further, the storage device 100 according to the second embodiment is connected to an IP (Internet Protocol) network with the use of the iSCSI (Internet Small Computer System Interface), and is connected to hosts 300 and 400 via the IP network. A network 200 used by the storage device 100, however, is not limited to the IP network. For example, if a fiber channel is used, the storage device 100 may be connected to the hosts 300 and 400 via a SAN (Storage Area Network) as the network 200. Further, the host 300 has an iSCSI Name of "xxx1," and is assigned with a host ID (Identifier) of "1." Further, the host 400 has an iSCSI Name of "xxx2," and is assigned with a host ID of "2."

The device unit 110 includes devices 111 to 114 and a device control unit 115. The devices 112 to 114 are similar in configuration to the device 111. Thus, detailed description thereof will be omitted here. The device 111, which is a storage unit for storing data read or written in accordance with a request from the host 300 or 400, is an HDD (Hard Disk Drive) or an SSD (Solid State Drive), for example.

The device control unit 115 performs reading or writing on the devices 111 to 114. For example, the device control unit 115 receives, from a control unit 124 via a device interface 122, a notification indicating which one of memory addresses is to be subjected to the reading or writing in which one of the devices 111 to 114. Then, the device control unit 115 performs the reading or writing on the basis of the received notification. For example, if a read request for reading data stored in a volume A of the device 111 is received from the host 300, the data control unit 115 reads the data stored in the volume A of the device 111, and transmits the read data to the control unit 120.

The control unit 120 includes a host interface 121, the device interface 122, a storage unit 123, and the control unit 124. In accordance with a request from the host 300 or 400, the control unit 120 controls data reading or writing on the device unit 110.

The host interface 121 receives from the host 300 or 400 a request for performing data reading or writing on the device unit 110, and transfers the received request to the control unit 124. For example, if a write request is received from the host 300 or 400, the host interface 121 transfers the data received from the host 300 or 400 to the device control unit 115 via the control unit 124. Further, if a read request is received from the host 300 or 400, the host interface 121 receives, via the control unit 124, the data read by the device control unit 115, and transfers the data to the host 300 or 400.

The device interface 122 receives from the control unit 124 the notification indicating which one of the memory addresses is to be subjected to the reading or writing in which one of the devices 111 to 114, and transfers the received notification to the device control unit 115. For example, if a write request is received from the host 300 or 400, the device interface 122 transfers the data received from the host 300 or 400 to the device control unit 115 via the control unit 124. Further, if a read request is received from the host 300 or 400, the device interface 122 receives the data read by the device control unit 115, and transfers the data to the control unit 124.

The storage unit 123, which is a storage device, such as a semiconductor memory device or a hard disk, for example, includes a host name storage table 123a and a command storage table 123b. Further, the storage unit 123 stores information as to which one of the volumes accepts access from the host 300 or 400 in which one of the devices 111 to 114. By reference to the information, the control unit 124 having received a request from the host 300 or 400 is capable of sending the device interface 122 the notification indicating which one of the memory addresses is to be subjected to the reading or writing in which one of the devices 111 to 114. Accordingly, the host 300 or 400 is capable of performing data reading or writing on the devices 111 to 114.

Figure 3:
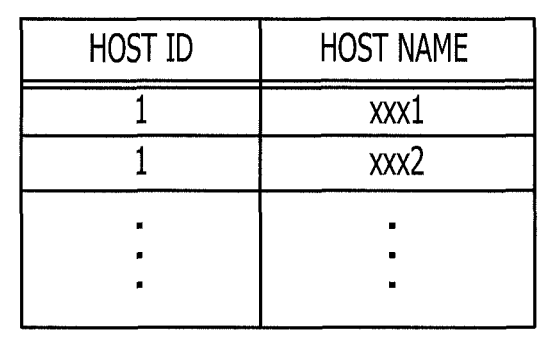

The host name storage table 123a stores the host names of hosts permitted to access the storage device 100. FIG. 3 is a diagram illustrating an example of information stored as the host name storage table 123a. For example, as illustrated in FIG. 3, the host name storage table 123a stores "host name" and "host ID," which is an identifier for uniquely identifying the host name, in association with each other. Specifically, the host name storage table 123a illustrated in FIG. 3 indicates that the "host name" of the host corresponding to the "host ID" of "1" is "xxx1." Further, the host name storage table 123a indicates that the "host name" of the host corresponding to the "host ID" of "2" is "xxx2." Herein, the host name storage table 123a is previously registered by a user.

The command storage table 123b stores commands issued by the host 300 or 400 permitted to access the devices 111 to 114. For example, the command storage table 123b stores a list of SCSI commands for acquiring information, such as the configuration, the type, and the storage capacity of the storage device 100, which are issued prior to the reading or writing on one of the devices 111 to 114 by the host 300 or 400.

FIG. 4 is a diagram illustrating an example of information stored as the command storage table 123b. For example, as illustrated in FIG. 4, the command storage table 123b includes items of "host ID," "issuance volume," "SCSI command," and "number of issuances." Herein, the "host ID" is an identifier for uniquely identifying the host name, and the "issuance volume" is information specifying a logical space included in a device. Further, the "SCSI command" represents the type of a command issued by the access-permitted host, and the "number of issuances" is the number of issuances of a command issued by the access-permitted host to acquire information, such as the configuration, the type, and the storage capacity of the storage device 100. That is, the "number of issuances" represents the number of issuances of a command which is for acquiring the information required for the login-permitted host to access a device, and which is issued during the time after the login and before the reading or writing on the device.

"Inquiry Standard" is a command for acquiring basic information representing the configuration of the storage device 100. "Inquiry Page" is a command for acquiring detailed information representing the configuration of the storage device 100. "Report Luns" is a command for acquiring information of a volume present in the storage device 100. "Test Unit Ready" is a command for acquiring information indicating whether or not the state of the volume specified by the host is the ready state. "Start Stop Unit" is a command for switching the host-specified volume to the accessible state or the inaccessible state. "Read Capacity (10)" is a command for acquiring information representing the capacity of the volume specified in the 10-byte format. "Read Capacity (16)" is a command for acquiring information representing the capacity of the volume specified in the 16-byte format. "Log Sense" is a command for acquiring the values of statistical information and the attributes of parameters held by the storage device 100. "Mode Sense (6) Page" is a command for acquiring information of the host-specified volume and the storage device 100 in the 6-byte format. The information is divided into pages, and the host acquires necessary information by specifying a page. "Mode Sense (10) Page" is a command for acquiring information of the host-specified volume and the storage device 100 in the 10-byte format. The information is divided into pages, and the host acquires necessary information by specifying a page. "Other Command" collectively refers to issued commands other than the above-described commands.

Specifically, the command storage table 123b illustrated in FIG. 4 stores information indicating that there have been three issuances of the "Inquiry Standard" command from the host identified by the "host ID" of "1" to the device identified by an "issuance volume" of "0". Further, the command storage table 123b stores information indicating that there have been three issuances of the "Inquiry Page" command, no issuance of the "Report Luns" command, one issuance of the "Test Unit Ready" command, and one issuance of the "Start Stop Unit" command. Further, the command storage table 123b stores information indicating that there have been one issuance of the "Read Capacity (10)" command, no issuance of the "Read Capacity (16)" command, and one issuance of the "Log Sense" command. Further, the command storage table 123b stores information indicating that there have been two issuances of the "Mode Sense (6) Page" command, no issuance of the "Mode Sense (10) Page" command, and one issuance of the "Other Command."

Further, another example of information stored as the command storage table 123b will be described with reference to a specific example. FIG. 5 is a diagram illustrating another example of information stored as the command storage table 123b. The command storage table 123b illustrated in FIG. 5 stores information indicating that there has been one issuance of the "Inquiry Standard" command from the host identified by the "host ID" of "2" to the device identified by an "issuance volume" of "1." Further, the command storage table 123b stores information indicating that there have been three issuances of the "Inquiry Page" command, five issuances of the "Report Luns" command, no issuance of the "Test Unit Ready" command, and no issuance of the "Start Stop Unit" command. Further, the command storage table 123b stores information indicating that there has been one issuance of the "Read Capacity (10)" command, no issuance of the "Read Capacity (16)" command, and no issuance of the "Log Sense" command. Further, the command storage table 123b stores information indicating that there has been no issuance of the "Mode Sense (6) Page" command, no issuance of the "Mode Sense (10) Page" command, and no issuance of the "Other Command."

Returning back to FIG. 2, the control unit 124 includes an internal memory for storing a control program, a program specifying a variety of processing procedures, and necessary data. The control unit 124 includes a login determination unit 124a, a command acquisition unit 124b, and an access determination unit 124c. Further, the control unit 124 is, for example, an integrated circuit, such as an ASIC (Application Specific Integrated Circuit) or an FPGA (Field Programmable Gate Array), or an electronic circuit, such as a CPU (Central Processing Unit) or an MPU (Micro Processing Unit).

Upon receipt of an access request from a host, the login determination unit 124a determines whether or not to permit login from the host. For example, the login determination unit 124a receives the access request from the host received by the host interface 121, and identifies the host name from the received request. Subsequently, the login determination unit 124a determines whether or not the identified host name is stored in the host name storage table 123a. Herein, if the identified host name is stored in the host name storage table 123a, the login determination unit 124a determines that the identified host name corresponds to a registered host, and permits login from the host. Meanwhile, if the identified host name is not stored in the host name storage table 123a, the login determination unit 124a determines that the identified host name does not correspond to any registered host, and rejects login from the host.

A specific example will be described with reference to the host name storage table 123a illustrated in FIG. 3. For example, if an access request is received from a host having a "host name" of "xxx1," the login determination unit 124a determines that the host name of "xxx1" is stored as an item corresponding to the "host ID" of "1" in the host name storage table 123a. Therefore, the login determination unit 124a permits login from the host having the host name of "xxx1."

Further, after the determination of whether or not to permit login is completed, the login determination unit 124a notifies the command acquisition unit 124b that the login has been permitted. The login determination unit 124a also sends the notification to the host interface 121 to cause the login-permitted host to transmit commands. Consequently, the host is allowed to issue commands for acquiring information, such as the configuration, the type, and the storage capacity of the storage device 100.

Upon receipt from the login determination unit 124a of the notification that the login has been permitted, the command acquisition unit 124b acquires, before the host performs reading or writing on one of the devices 111 to 114, the commands issued to acquire the information of the storage device 100 and the devices 111 to 114. Herein, the command acquisition unit 124b acquires the commands from a CDB (Command Descriptor Block) format transmitted by the host 300 or 400.

With reference to FIG. 6, description will be made of the commands stored in the CDB format transmitted by the host 300 or 400 during the time after the permission of the login and before the reading or writing on one of the devices 111 to 114. Herein, the host 300 or 400 transmits the commands to thereby acquire information, such as the configuration, the type, and the storage capacity of the storage device 100 and the devices 111 to 114. FIG. 6 is a diagram illustrating an example of the CDB format storing the commands acquired by the command acquisition unit 124b. As illustrated in FIG. 6, the CDB format includes items of "Bit" and "Byte," and the "Bit" includes 8 bits of "0" to "7." The "Byte" includes "0" to "N" bytes, and "N" represents a number ranging from 5 to 31. Thus, the "Byte" includes 6 to 32 bytes. As an item corresponding to the "0" byte, "operation code" for identifying the SCSI command is stored. The SCSI commands identified by the "operation code" have been described above. Thus, detailed description thereof will be omitted here. Further, as items corresponding to the "1" byte and the subsequent bytes, parameter information is stored.

Returning back to FIG. 2, the command acquisition unit 124b acquires the SCSI commands in the order of issuance of the commands by the host, and counts the acquired commands. For example, the command acquisition unit 124b acquires the commands issued by the hosts 300 and 400, and collects information as to which one of the hosts 300 and 400 has issued the SCSI commands, which one of the volumes has received the issued SCSI commands, and how many times each of the SCSI commands has been issued.

A specific example of the commands counted by the command acquisition unit 124b will be described with reference to FIGS. 7 and 8. FIG. 7 is a diagram illustrating an example of the commands issued by the host 300. FIG. 8 is a diagram illustrating an example of the commands issued by the host 300 and counted by the command acquisition unit 124b.

First, as illustrated in FIG. 7, the command acquisition unit 124b counts the commands issued before the login-permitted host 300 performs reading or writing on one of the devices 111 to 114, by associating the type of the commands with the number of issuances of the commands. The result of counting by the command acquisition unit 124b is used in the later-described determination by the access determination unit 124c of whether or not the host is an access-permitted host. FIG. 7 illustrates that the host 300 identified by the host ID of "1" has issued the "Inquiry Standard" command in the first issuance to a device including the volume "0." Further, FIG. 7 illustrates that the host 300 has issued the "Inquiry Standard" command in the second issuance, the "Test Unit Ready" command in the third issuance, and the "Start Stop Unit" command in the fourth issuance to the device including the volume "0." Further, FIG. 7 illustrates that the host 300 has issued the "Inquiry Standard" command in the fifth issuance, the "Read Capacity (210)" command in the sixth issuance, the "Log Sense" command in the seventh issuance, and the "Mode Sense (6) Page 03" command in the eighth issuance to the device including the volume "0." Further, FIG. 7 illustrates that the host 300 has issued the "Mode Sense (6) Page 04" command in the ninth issuance, the "Inquiry Page 00" command in the tenth issuance, and the "Inquiry Page 80" command in the eleventh issuance to the device including the volume "0." Further, FIG. 7 illustrates that the host 300 has issued the "Inquiry Page 83" command in the twelfth issuance and the "Persistent Reserve In" command in the thirteenth issuance to the device including the volume "0." The "Persistent Reserve In" command is a command for solving contention among a plurality of hosts for access to a device.

Subsequently, the counting of the commands by the command acquisition unit 124b will be described with reference to an example in which the host 300 has issued the commands illustrated in FIG. 7. The command acquisition unit 124b has acquired the information that the "Inquiry Standard" command had been issued in the first, second, and fifth issuances, and thus counts the number of issuances of the "Inquiry Standard" command as three. Further, the command acquisition unit 124b has acquired the information that the "Inquiry Page" command had been issued in the tenth, eleventh, and twelfth issuances, and thus counts the number of issuances of the "Inquiry Page" command as three. Further, the command acquisition unit 124b has not acquired the information that the "Report Luns" command had been issued, and thus counts the number of issuances of the "Report Luns" command as zero.

Further, the command acquisition unit 124b has acquired the information that the "Test Unit Ready" command had been issued in the third issuance, and thus counts the number of issuances of the "Test Unit Ready" command as one. Further, the command acquisition unit 124b has acquired the information that the "Start Stop Unit" command had been issued in the fourth issuance, and thus counts the number of issuances of the "Start Stop Unit" command as one. Further, the command acquisition unit 124b has acquired the information that the "Read Capacity (10)" command had been issued in the sixth issuance, and thus counts the number of issuances of the "Read Capacity (10)" command as one. Further, the command acquisition unit 124b has not acquired the information that the "Read Capacity (16)" command had been issued, and thus counts the number of issuances of the "Read Capacity (16)" command as zero. Further, the command acquisition unit 124b has acquired the information that the "Log Sense" command had been issued in the seventh issuance, and thus counts the number of issuances of the "Log Sense" command as one.

Further, the command acquisition unit 124b has acquired the information that the "Mode Sense (6) Page" command had been issued in the eighth and ninth issuances, and thus counts the number of issuances of the "Mode Sense (6) Page" command as two. Further, the command acquisition unit 124b has not acquired the information that the "Mode Sense (10) Page" command had been issued, and thus counts the number of issuances of the "Mode Sense (10) Page" command as zero. Further, the command acquisition unit 124b has acquired the information that the "Persistent Reserve In" command had been issued in the thirteenth issuance, and thus counts the number of issuances of the "Persistent Reserve In" command as one. Herein, the command acquisition unit 124b treats the "Persistent Reserve In" command as the "Other Command," and thus counts the number of issuances of the "Other Command" as one.

Having performed the above-described process, the command acquisition unit 124b obtains the counting result as illustrated in FIG. 8. FIG. 8 illustrates the result of counting by the command acquisition unit 124b, representing the type and the number of issuances of each of the SCSI commands issued by the host 300 having the "host ID" of "1" to the volume "0."

Further, FIG. 9 illustrates the result of similar counting by the command acquisition unit 124b of the commands issued before the login-permitted host 400 performs reading or writing on one of the devices 111 to 114, with the type and the number of issuances of each of the commands associated with each other. FIG. 9 is a diagram illustrating an example of the commands issued by the host 400 and counted by the command acquisition unit 124b.

The example of FIG. 9 illustrates the number of issuances of each of the commands issued when the host 400 identified by the "host ID" of "2" requests access to the device identified by the "issuance volume" of "1." The command acquisition unit 124b counts two issuances of the "Inquiry Standard" command, no issuance of the "Inquiry Page" command, one issuance of the "Report Luns" command, and one issuance of the "Test Unit Ready" command. Further, the command acquisition unit 124b counts no issuance of the "Start Stop Unit" command, one issuance of the "Read Capacity (10)" command, no issuance of the "Read Capacity (16)" command, and no issuance of the "Log Sense" command. Further, the command acquisition unit 124b counts two issuances of the "Mode Sense (6) Page" command, no issuance of the "Mode Sense (10) Page" command, and no issuance of the "Other Command." The command acquisition unit 124b counts the "Persistent Reserve In" command as the "Other Command."

Further, after completion of the counting, the command acquisition unit 124b stores the counting result in the internal memory or the like included in the control unit 124. Subsequently, the command acquisition unit 124b determines whether or not the counted commands have been registered as the command storage table 123b. For example, the command acquisition unit 124b determines whether or not the command storage table 123b is present which includes the same "host ID" and "issuance volume" as the "host ID" and "issuance volume" of the counted commands.

If it is determined that the counted commands have not been registered as the command storage table 123b, the command acquisition unit 124b stores the counted commands as the command storage table 123b. For example, if the command storage table 123b including the same "host ID" and "issuance volume" is absent, the command acquisition unit 124b determines that the command storage table 123b has not been registered. This case includes, for example, a case in which a host first requests access to the storage device 100. Further, the command acquisition unit 124b notifies the access determination unit 124c that the command storage table 123b including the same "host ID" and "issuance volume" as the "host ID" and "issuance volume" of the counted commands has not been registered.

Meanwhile, if it is determined that the counted commands have been registered as the command storage table 123b, the command acquisition unit 124b notifies the access determination unit 124c of the determination, to thereby cause the access determination unit 124c to determine whether or not the contents of the counted commands are the same as the registered contents. Specifically, the command acquisition unit 124b identifies "1" in the "host ID" of the counting result illustrated in FIG. 8, and determines that the host ID is the same as the "host ID" stored in the command storage table 123b illustrated in FIG. 4.

Returning back to FIG. 2, if it is determined by the command acquisition unit 124b that there are commands corresponding to the same host ID, the access determination unit 124c is notified of the determination by the command acquisition unit 124b. Then, the access determination unit 124c determines whether or not the contents of the commands counted by the command acquisition unit 124b are the same as the contents of the information stored in the command storage table 123b. For example, the access determination unit 124c determines whether or not the contents of the counted commands and the contents of the command storage table 123b match each other in terms of the information stored in the "SCSI command" and the information stored in the "number of issuances."

If the contents of the information stored in the command storage table 123b and the contents of the information of the counting by the command acquisition unit 124b completely match each other, the access determination unit 124c determines that the host is an access-permitted host, and permits access from the host. As a specific example, description will be made of an example in which the command acquisition unit 124b has acquired the counting result illustrated in FIG. 8. The access determination unit 124c compares the command storage table 123b illustrated in FIG. 4 with the counting result illustrated in FIG. 8, and determines whether or not there is a match in commands therebetween.

Specifically, the access determination unit 124c reads the command storage table 123b illustrated in FIG. 4 from the storage unit 123, and reads the command counting result illustrated in FIG. 8 from the internal memory or the like included in the control unit 124. Subsequently, on the basis that the number of issuances of the "Inquiry Standard" command is three in both the command storage table 123b illustrated in FIG. 4 and the counting result illustrated in FIG. 8, the access determination unit 124c determines that the number of issuances is the same. Similarly, the access determination unit 124c determines that the command storage table 123b and the counting result have the same number of issuances in the "Inquiry Page" command, the "Report Luns" command, and the "Test Unit Ready" command. Further, the access determination unit 124c determines that the command storage table 123b and the counting result have the same number of issuances in the "Start Stop Unit" command, the "Read Capacity (10)" command, and the "Read Capacity (16)" command. Further, the access determination unit 124c determines that the command storage table 123b and the counting result have the same number of issuances in the "Log Sense" command, the "Mode Sense (6) Page" command, and the "Mode Sense (10) Page" command. Further, the access determination unit 124c determines that the command storage table 123b and the counting result have the same number of issuances in the "Other Command."

If the command acquisition unit 124b has acquired the counting result illustrated in FIG. 8, therefore, the access determination unit 124c determines that the host 300 having requested access is identical with the host 300, the access request of which has been permitted. Then, the access determination unit 124c permits access from the host 300 having requested access.

Meanwhile, if it is determined that the contents of the information stored in the command storage table 123b and the contents of the information of the counting by the command acquisition unit 124b do not completely match each other, the access determination unit 124c determines spoofing by the host, and rejects access from the host. That is, the access determination unit 124c cuts off the connection to the host. As a specific example, description will be made of an example in which the access determination unit 124c has acquired the counting result illustrated in FIG. 9. The access determination unit 124c compares the command storage table 123b illustrated in FIG. 5 with the counting result illustrated in FIG. 9, and determines whether or not there is a match in commands therebetween.

Specifically, on the basis that the number of issuances of the "Inquiry Standard" command is one in the command storage table 123b illustrated in FIG. 5 and two in the counting result illustrated in FIG. 9, the access determination unit 124c determines that the number of issuances is not the same. If the command acquisition unit 124b has acquired the counting result illustrated in FIG. 9, therefore, the access determination unit 124c determines that the host 400 having requested access is not identical with the host 400, the access request of which has been permitted. Then, the access determination unit 124c determines that the host 400 having requested access is a spoofing host, and rejects access from the host. Further, the access determination unit 124c cuts off the connection established with the host.

Further, if the access determination unit 124c is notified by the command acquisition unit 124b that the command storage table 123b has not been registered, the access determination unit 124c permits access from the host having requested access.

Figure 10:
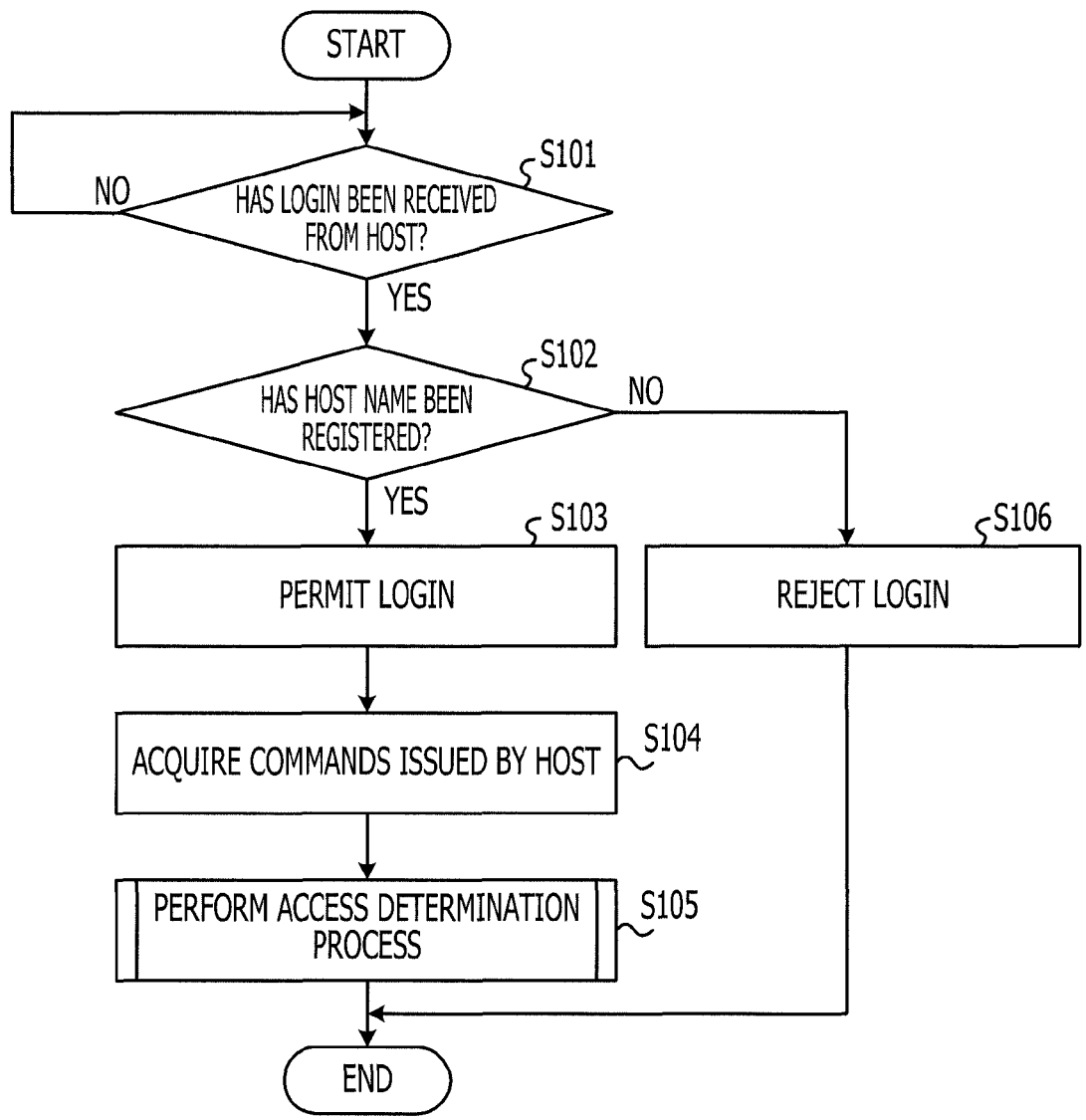
FIG. 10 is a flowchart illustrating a processing procedure of processing performed by the storage device according to the second embodiment.

Processing Procedure of Processing by Storage Device: Subsequently, a processing procedure of the processing by the storage device 100 will be described with reference to FIG. 10. FIG. 10 is a flowchart illustrating a processing procedure of the processing by the storage device 100 according to the second embodiment. Upon receipt of login from a host (YES at S101), the login determination unit 124a determines whether or not the host name of the host has been registered (S102). If it is determined that the host name has not been registered (NO at S102), the login determination unit 124a rejects login from the host (S106), and completes the processing.

Meanwhile, if it is determined that the host name has been registered (YES at S102), the login determination unit 124a permits login from the host (S103). Subsequently, prior to reading or writing on one of the devices 111 to 114 by the host, the command acquisition unit 124b acquires commands issued to acquire the information of the storage device 100 and the devices 111 to 114 (S104). Then, the storage device 100 performs an access determination process of determining, on the basis of the contents of the acquired commands, whether or not to permit access from the host having requested access (S105), and completes the processing.

If access from the host is permitted, the storage device 100 may omit the above-described processes of S101 to S105 until the disconnection from the host. For example, the storage device 100 may perform the processes of S101 to S105, if an error is detected, or when reestablishing the connection.

Figure 11:
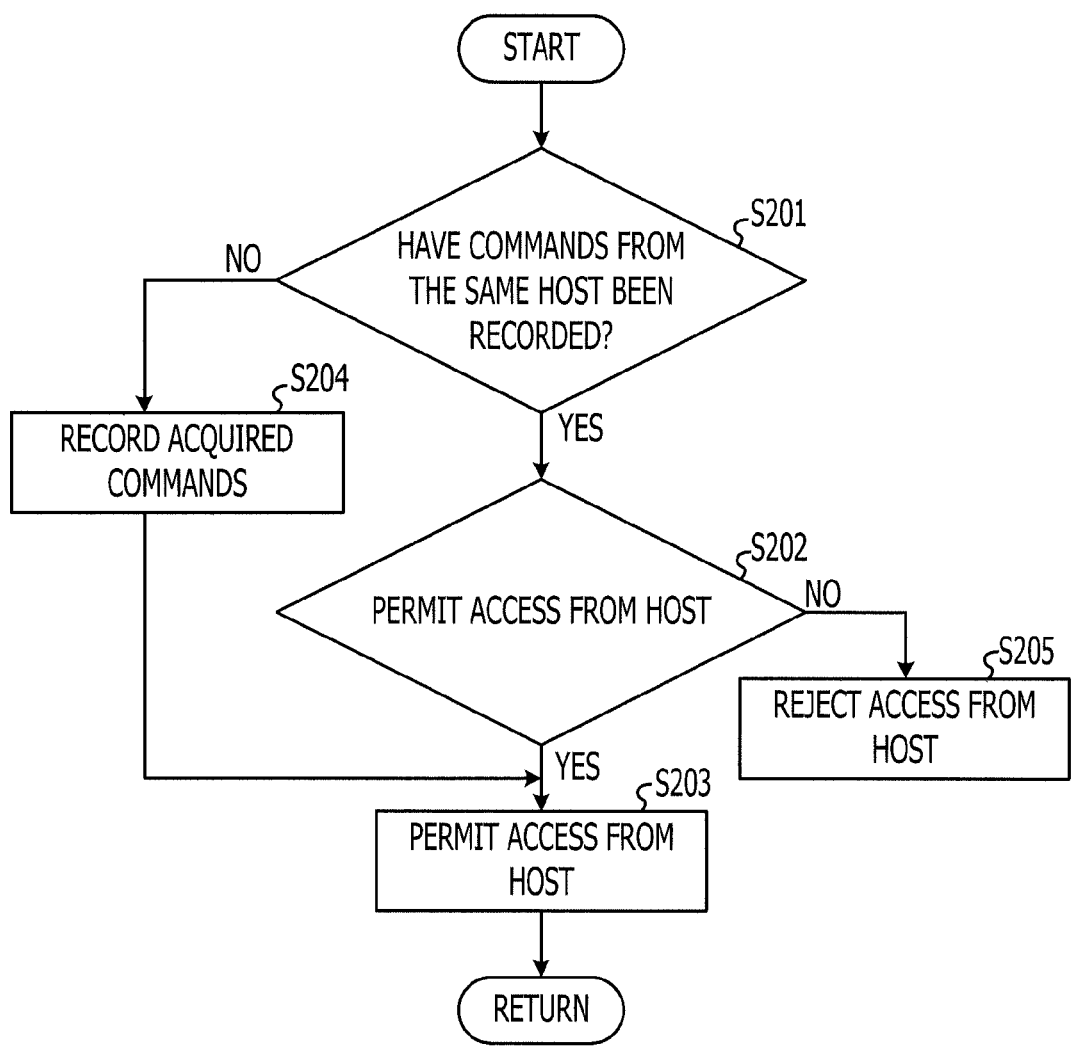
FIG. 11 is a flowchart illustrating a process procedure of an access determination process performed by the storage device according to the second embodiment.

Process Procedure of Access Determination Process by Storage Device: Subsequently, a process procedure of the access determination process by the storage device 100 will be described with reference to FIG. 11. FIG. 11 is a flowchart illustrating a process procedure of the access determination process by the storage device 100 according to the second embodiment. The process corresponds to S105 of FIG. 10.

Upon acquisition of the commands issued by the host in the process of S104, the command acquisition unit 124b determines whether or not the command storage table 123b is present which includes the same host ID as the host ID of the counted commands (S201). If it is determined that the command storage table 123b is absent (NO at S201), the command acquisition unit 124b stores the counted commands as the command storage table 123b (S204). Subsequently, the access determination unit 124c permits access from the host having requested access (S203), and completes the process.

If it is determined by the command acquisition unit 124b that the command storage table 123b is present (YES at S201), the access determination unit 124c determines whether or not there is a match in information (S202). That is, the access determination unit 124c determines whether or not the information stored in the command storage table 123b and the commands acquired by the command acquisition unit 124b match each other.

Herein, if it is determined that there is a match in information (YES at S202), the access determination unit 124c permits access from the host having requested access (S203), and completes the process. Meanwhile, if it is determined that there is no match in information (NO at S202), the access determination unit 124c rejects access from the host having requested access (S205), and completes the process.

Effects of Second Embodiment: In the storage device 100 according to the present embodiment, the login determination unit 124a determines whether or not the host name of the host having requested access has been registered. If it is determined by the login determination unit 124a that the host name of the host having requested access has been registered, the command acquisition unit 124b acquires the commands issued by the host, and counts the acquired commands. The access determination unit 124c determines whether or not the commands counted by the command acquisition unit 124b match the commands issued by an access-permitted host, and permits access from the host if there is a match in commands. Further, the commands stored as the command storage table 123b are different, depending on the hardware or software forming the host 300 or 400. That is, if hosts are the same, the commands issued by the hosts are also the same.

Accordingly, the present second embodiment is capable of preventing spoofing by a third party having acquired a valid host name in some way. Consequently, the storage device 100 is capable of preventing data from being destroyed by a third party or leaked to a third party.

Meanwhile, the storage device disclosed in the present application may be implemented in a variety of different embodiments other than the above-described embodiments. In a third embodiment, therefore, description will be made of other embodiments of the storage device disclosed in the present application.

System Configuration and Others: In the processes described in the present embodiments, all or a part of the processes described as automatically performed may also be manually performed. Alternatively, all or a part of the processes described as manually performed may also be automatically performed by a publicly known method. In addition, the process procedures, the control procedures, and the specific names described in the above text and drawings may be arbitrarily modified, unless otherwise specified.

In the foregoing description, the command storage table 123b stores the commands counted by the command acquisition unit 124b, when a host first requests access to the storage device 100. However, the embodiment is not limited thereto. For example, the command storage table 123b may previously store commands predicted on the basis of the relationship between the host and the storage device 100. For example, the commands are predicted from the model type of the host, the OS (Operating System) to be used, the Host Bus Adapter or the RAID (Redundant Array of Inexpensive Disks) of the storage device 100, and the type of the disk or the like.

In the foregoing description, the commands counted by the command acquisition unit 124b are stored in the internal memory or the like included in the control unit 124. However, the embodiment is not limited thereto. For example, the command acquisition unit 124b may store the commands counted thereby in a storage region included in the storage unit 123.

In the foregoing description, the command acquisition unit 124b counts the "Persistent Reserve In" command as the "Other Command." However, the embodiment is not limited thereto. For example, other commands may be counted as the "Other Command." Specifically, the command acquisition unit 124b may count the "Mode Sense (6) Page" command and the "Mode Sense (10) Page" command as the "Other Command."

Further, the number of the commands used in the determination by the access determination unit 124c may be arbitrary selected, and the commands may be arbitrarily combined. For example, the access determination unit 124c may perform the access determination by using only the "Inquiry Standard" command, the "Inquiry Page" command, the "Report Luns" command, the "Test Unit Ready" command, and the "Start Stop Unit" command. Further, the access determination unit 124c may perform the access determination by using commands other than the SCSI commands described in FIGS. 4 and 5.

Further, the access determination unit 124c may perform the determination in consideration of the order of commands. For example, the command acquisition unit 124b stores the commands in the internal memory or the like of the control unit 124 by associating the type of the acquired commands with the order of acquisition of the commands. Further, the command storage table 123b stores the commands such that the type of the commands issued by the host and the order of the issuance of the commands are associated with each other. Further, the access determination unit 124c determines whether or not the contents of the information stored in the command storage table 123b and the contents of the information acquired by the command acquisition unit 124b completely match each other.

Further, the information stored by the storage units illustrated in the drawings is merely one example, and does not always need to be stored as illustrated in the drawings. For example, other SCSI commands may be stored as the commands stored as the command storage table 123b. Specifically, the command storage table 123b may store "Space" and "Read Position" commands as the SCSI commands.

Further, the constituent components illustrated in the drawings are functional and conceptual, and do not always need to be physically configured as illustrated in the drawings. For example, in the storage device 100, the command acquisition unit 124b and the access determination unit 124c may be integrated together. Further, all or an arbitrary part of the processing functions performed by the devices may be realized by a CPU and a program analyzed and executed by the CPU, or may be realized as hardware based on wired logic.

Program: Meanwhile, the variety of processes described in the above embodiments may be realized by a previously prepared program executed by a computer system, such as a personal computer or a workstation. In the following, therefore, description will be made of an example of a computer system which executes a program having similar functions to the functions of the above-described embodiments.

Figure 12:
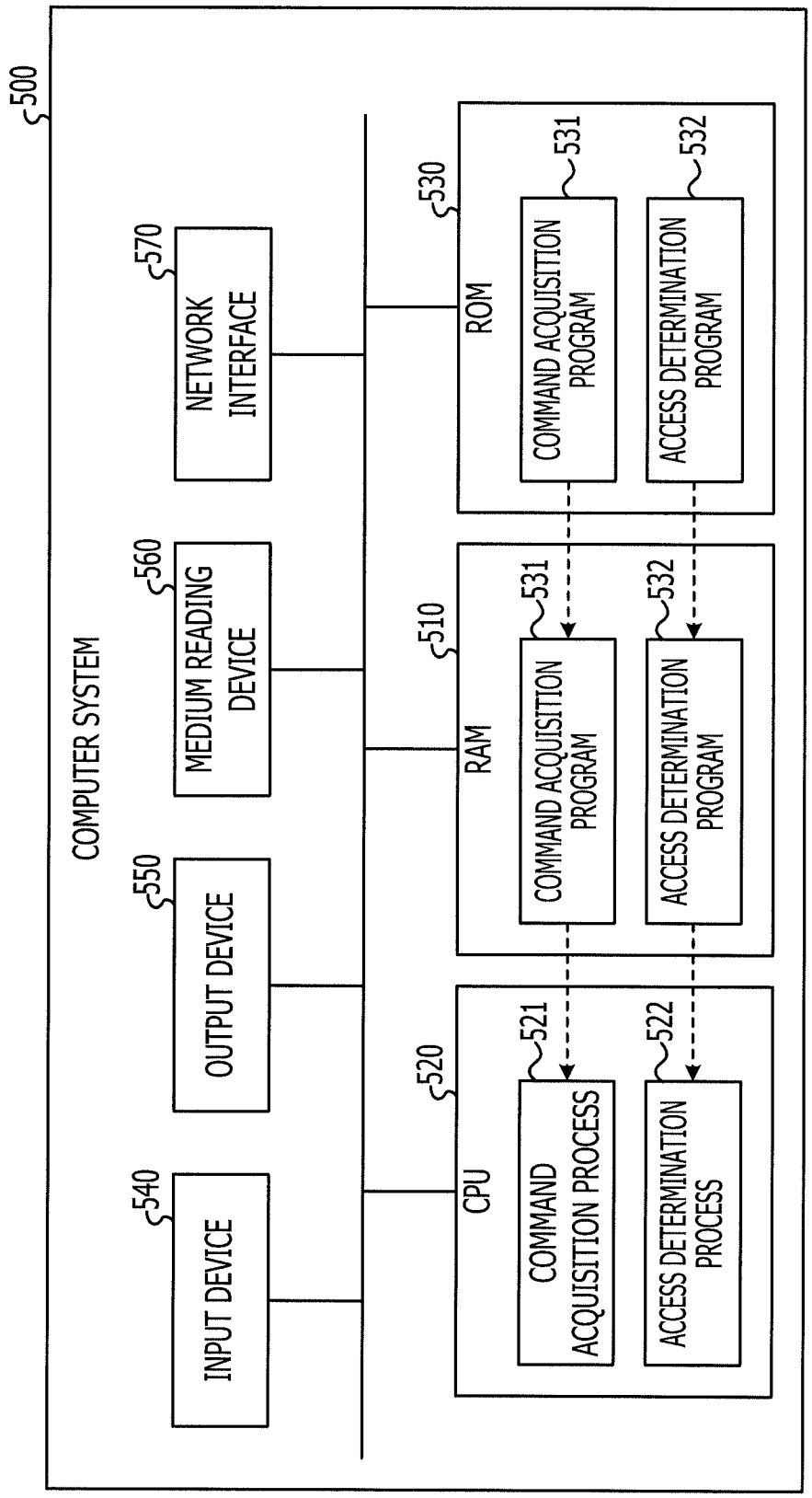
FIG. 12 is a diagram illustrating an example of a computer system which executes an access control program.
Figure 13:
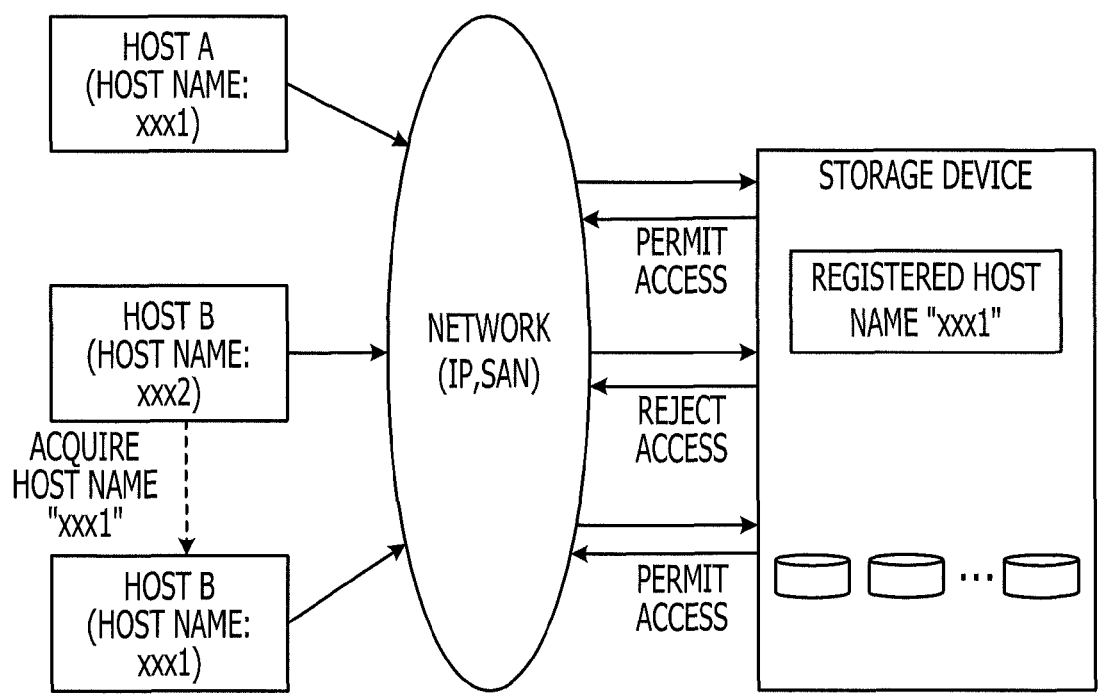
FIG. 13 is a diagram for explaining host identification by a storage device according to related art.

FIG. 12 is a diagram illustrating a computer system 500 which executes an access control program. As illustrated in FIG. 12, the computer system 500 includes a RAM (Random Access Memory) 510, a CPU 520, a ROM (Read-Only Memory) 530, an input device 540, an output device 550, a medium reading device 560, and a network interface 570. Herein, the ROM 530 previously stores a program which exerts similar functions to the functions of the above-described embodiments. That is, as illustrated in FIG. 12, the ROM 530 previously stores a command acquisition program 531 and an access determination program 532.

Further, the CPU 520 reads and expands the command acquisition program 531 and the access determination program 532 in the RAM 510. Then, the CPU 520 executes the command acquisition program 531 as a command acquisition process 521. Further, the CPU 520 executes the access determination program 532 as an access determination process 522. The command acquisition process 521 corresponds to the command acquisition unit 124b illustrated in FIG. 2. Similarly, the access determination process 522 corresponds to the access determination unit 124c.

Meanwhile, the above-described programs 531 and 532 do not always need to be stored in the ROM 530. For example, the programs 531 and 532 may be stored in a "portable physical medium," such as an FD (Flexible Disc), a CD-ROM (Compact Disc-ROM), an MO (Magneto-Optical) disc, a DVD (Digital Versatile Disc), or an IC (Integrated Circuit) card, which is inserted into the computer system 500. Further, the programs 531 and 532 may be stored in "a fixed physical medium," such as an HDD (Hard Disk Drive) provided inside or outside the computer system 500. Furthermore, the programs 531 and 532 may be stored in a storage medium of "another computer system" connected to the computer system 500 via a public line, the Internet, a LAN (Local Area Network), a WAN (Wide Area Network), or the like. Further, the computer system 500 may read and execute the program from one of the above-described media and the media may be non-transitory.

That is, the program is computer-readably stored in a recording medium, such as the "portable physical medium," the "fixed physical medium," or the "communication medium" described above. Further, the computer system 500 reads and executes the program from such a recording medium, to thereby realize similar functions to the functions of the above-described embodiments. The program in the another embodiment is not limited to the execution by the computer system 500. For example, the present invention may be similarly applied to the execution of the program by another computer system or a server or by the cooperation thereof.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A storage device storing data, the storage device comprising:
 a device configured to store data in one or more volumes read or written by one or more hosts;
 a storage device configured to store commands transmitted by the host to acquire information relating to the device, the stored commands including a command storage table for each combination of one of the one or more volumes and one of the one or more hosts;
 a processor configured to:
  acquire, for each combination, commands issued to the device when the one or more hosts request access to the data stored in the device and to count a number of issuances per type of command from among the acquired commands;
  determine, for each combination, whether the counted commands have been previously stored as a command storage table in the storage device, when the counted commands have not been previously stored as a command storage table in the storage device, store the counted commands as a command storage table in the storage device, and, when the counted commands have been previously stored as a command storage table in the storage device, provide a notification; and
  when receiving the notification, permit the access, on a per host basis, when a type of command and number of issuances of the commands acquired by the processor exactly match the respective type and number of issuances of the commands previously stored as a command storage table in the storage device and reject the access, on a per host basis, when the type of command and number of issuances of commands acquired by the processor do not exactly match the respective type and number of issuances of the commands previously stored as a command storage table in the storage device.

2. The storage device according to claim 1, wherein the storage device stores the commands issued to the device and respective orders of issuance of the commands by associating the commands with the orders, wherein, when the host requests the access, the processor acquires the commands issued to the device and the respective orders of issuance of the commands by associating the commands with the orders, and wherein, when the commands acquired by the processor and associated with the orders have been stored in the storage device, the access determination unit permits the access.

3. A storage device storing data, the storage device comprising:

a device configured to store data in one or more volumes read or written by one or more hosts;

a memory to store commands transmitted by the host to acquire information relating to the device, the stored commands including a command storage table for each combination of one of the one or more volumes and one of the one or more hosts;

a processor to:

acquire, for each combination, commands issued to the device when the one or more hosts request access to the data stored in the device and to count a number of issuances per type of command from among the acquired commands;

determine, for each combination, whether the counted commands have been previously stored as a command storage table in the memory;

when the counted commands have not been previously stored as a command storage table in the memory, store the counted commands as a command storage table in the memory, and when the counted commands have been previously stored as a command storage table in the memory, provide a notification; and when receiving the notification, permit the access, on a per host basis, when a type of command and number of issuances of the acquired commands exactly match the respective type and number of issuances of the commands previously stored as a command storage table in the memory and reject the access when the type of command and number of issuances of the acquired commands do not exactly match the respective type and number of issuances of the commands previously stored as a command storage table in the memory.

4. The storage device according to claim 3, wherein the memory stores the commands issued to the device and respective orders of issuance of the commands by associating the commands with the orders, wherein, when the host requests the access, the processor is configured to acquire the commands issued to the device and the respective orders of issuance of the commands by associating the commands with the orders, and wherein, when the commands acquired by the processor and associated with the orders have been stored in the memory, the processor is configured to permit the access.

5. A computer-readable, non-transitory medium storing therein a control program for controlling a storage device storing data in a device, the control program causing the storage device to perform a procedure, the procedure comprising:

storing, in a storage device, commands transmitted by a one or more hosts to acquire information relating to the device, the stored commands including a command storage table for each combination of one of one or more volumes of the device and one of the one or more hosts;

performing command acquisition to acquire, for each combination, commands issued to the device when the one or more hosts request access to the device and counting a number of issuances per type of command from among the acquired commands;

determining, for each combination, whether the counted commands have been previously stored as a command storage table in the storage device, when the counted commands have not been previously stored as a command storage table in the storage device, storing the counted commands as a command storage table in the storage device, and, when the counted commands have been previously stored as a command storage table in the storage device, providing a notification; and when receiving the notification, permitting the access, on a per host basis, when a type of command and number of issuances of the commands acquired by the command acquisition exactly match the respective type and number of issuances of the commands previously stored as a command storage table in the storage device and rejecting the access when the type of command and number of issuances of the commands acquired by the command acquisition do not exactly match the respective type and number of issuances of the commands previously stored as a command storage table in the command storage unit.

6. A control method of a storage device storing data in a device, the control method comprising:

storing, in a storage device, commands transmitted by one or more hosts to acquire information relating to the device, the stored commands including a command storage table for each combination of one of one or more volumes of the device and one of the one or more hosts;

acquiring, for each combination, commands issued to the device when the one or more hosts request access to the data stored in the device and counting a number of issuances per type of command from among the acquired commands;

determining, for each combination, whether the counted commands have been previously stored as a command storage table in the storage device, when the counted commands have not been previously stored as a command storage table in the storage device, storing the counted commands as a command storage table in the storage device, and, when the counted commands have been previously stored as a command storage table in the storage device, providing a notification; and when receiving the notification, permitting the access, when a type of command and number of issuances of the commands acquired by the acquiring exactly match the respective type and number of issuances of the commands previously stored as a command storage table in the storage device and rejecting the access when the type of command and number of issuances of the commands acquired by the acquiring do not exactly match the respective type and number of issuances of the commands previously stored as a command storage table in the storage device.

7. The control method according to claim 6, wherein the memory stores the commands issued to the device and respective orders of issuance of the commands by associating the commands with the orders, wherein, when the host requests the access, the acquiring acquires the commands issued to the device and the respective orders of issuance of the commands by associating the commands with the orders, and wherein, when the commands acquired by the acquiring and associated with the orders have been stored in the memory, the permitting permits the access.

* * * * *

UNITED STATES PATENT AND TRADEMARK OFFICE
CERTIFICATE OF CORRECTION

| | |
|---|---|
| PATENT NO. | : 8,706,997 B2 |
| APPLICATION NO. | : 13/167353 |
| DATED | : April 22, 2014 |
| INVENTOR(S) | : Katano |

Page 1 of 1

It is certified that error appears in the above-identified patent and that said Letters Patent is hereby corrected as shown below:

In the Claims

Column 16, Line 1, Claim 5, after "transmitted by" delete "a".

Signed and Sealed this
Twenty-ninth Day of July, 2014

Michelle K. Lee
*Deputy Director of the United States Patent and Trademark Office*